(12) United States Patent
Raulin et al.

(10) Patent No.: US 7,004,723 B2
(45) Date of Patent: Feb. 28, 2006

(54) DEVICE FOR CONTROLLING VARIABLE-PITCH VANES IN A TURBOMACHINE

(75) Inventors: Dominique Raulin, Avon (FR); Fabrice Marois, Melun (FR); Alain Chatel, Melun (FR); Alain Bouron, Lieusaint (FR)

(73) Assignee: Snecma Moteurs, Paris (FR)

( * ) Notice: Subject to any disclaimer, the term of this patent is extended or adjusted under 35 U.S.C. 154(b) by 118 days.

(21) Appl. No.: 10/825,306

(22) Filed: Apr. 16, 2004

(65) Prior Publication Data
US 2004/0208742 A1    Oct. 21, 2004

(30) Foreign Application Priority Data
Apr. 16, 2003   (FR) .................................. 03 04735

(51) Int. Cl.
*B01D 17/16*    (2006.01)
(52) U.S. Cl. .................................... 415/160

(58) Field of Classification Search ................ 415/160, 415/151
See application file for complete search history.

(56) References Cited

U.S. PATENT DOCUMENTS

| | | | | |
|---|---|---|---|---|
| 3,685,920 A | * | 8/1972 | Burge | 415/147 |
| 4,773,821 A | * | 9/1988 | Gonthier et al. | 415/150 |
| 5,601,401 A | * | 2/1997 | Matheny et al. | 415/160 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

A device for controlling variable-pitch vanes in a turbomachine comprises links connecting the radial pivots of the vanes to radial fingers carried by semicircular elements and bridges of a control ring, the links being mounted in ball-and-socket manner on the radial fingers which are fixed to the control ring. This form of mounting enables all the vanes associated with the control ring to be set to the same angular pitch.

6 Claims, 2 Drawing Sheets

DEVICE FOR CONTROLLING VARIABLE-PITCH VANES IN A TURBOMACHINE

The invention relates to a device for controlling variable-pitch vanes in a turbomachine, such as an airplane turboprop or turbojet engine, in particular.

BACKGROUND OF THE INVENTION

In such a turbomachine, the purpose of adjusting the angular position or "pitch" of certain stator vanes is to optimize the efficiency of the turbomachine and to reduce its fuel consumption under differing flight configurations. Such adjustment is generally performed for one or more rows of vanes by means of a control ring which surrounds the outside of the turbomachine stator and which can be turned about the longitudinal axis of the stator by drive means such as an actuator or an electric motor. Turning movement of the ring is transmitted by links to the vanes of the row, each link being secured at one of its ends to a vane and carrying a radial finger at its other end, which finger is engaged in a cylindrical housing in the control ring.

In turbomachines presenting a certain power level, the casing of the stator is made up of two semicylindrical shells including longitudinal junction flanges which project outwards from the casing. Because of the presence of such longitudinally-extending flanges, each control ring is made up of two approximately semicircular elements rigidly interconnected at their ends by two bridges that are placed astride the flanges of the casing and that allow the ring to turn through a certain angle about the longitudinal axis of the casing.

The radial fingers of the links extend inwards when they are designed to be received in housings of the substantially semicircular ring elements, and they extend radially outwards when they are designed to be received in cylindrical housings of the bridges, since the bridges are further away from the longitudinal axis of the casing that are the semicircular elements of the ring.

As a result, the points of rotation of the links connected to the bridges are further away from the longitudinal axis of the casing than are the points of rotation of the links connected to the semicircular elements of the ring, and angular displacement of the ring about the axis of the casing leads to the vanes connected by links to the semicircular ring elements being turned through a certain angle while the vanes connected by links to the bridges of the ring are turned through a greater angle.

This different adjustment of the vanes connected to the bridges impedes optimization of efficiency and fuel saving.

OBJECTS AND SUMMARY OF THE INVENTION

A particular object of the present invention is to provide a solution to this problem that is simple, effective, and inexpensive.

To this end, the invention provides a device for controlling variable-pitch vanes in a turbomachine, the vanes having radial pivots mounted in bearings in a casing and connected by links to a control ring surrounding the outside of the casing, said ring comprising two substantially semicircular elements rigidly interconnected at their ends by bridges disposed astride longitudinal flanges of the casing, wherein the links are pivotally mounted on the ends of radial fingers carried by the semicircular elements and by the bridges of the control ring, and wherein the fingers carried by the semicircular elements extend radially outwards from said elements, and the fingers carried by the bridges extend radially inwards from said bridges so that the pivot points of the links on said fingers are at the same distance from the pivot axis of the control ring both for the radial fingers carried by the semicircular elements and for the radial fingers carried by the bridges of the control ring.

By means of this configuration, the points of rotation of the links are situated in the contact zones between the links and the radial fingers, and no longer in the contact zones between the radial fingers and their cylindrical housings, thereby guaranteeing that angular displacement of the ring leads to the same amount of turning for all of the vanes in the row.

According to another characteristic of the invention, the links are mounted in ball-and-socket manner on the radial fingers.

This makes it possible to reduce the stresses and deformations of the links while adjusting the angular pitch of the vanes.

In a first embodiment, the above-mentioned radial fingers are mounted in radial cylindrical housings of the semicircular elements and of the bridges of the control ring, and they are held therein by angled tabs fixed by screws to said elements and bridges and co-operating with the ends of the fingers on which the links are mounted.

In another embodiment of the invention, the radial fingers are crimped at their ends remote from the links in cylindrical housings of the semicircular elements and of the bridges of the control ring.

This configuration leads to a saving in weight since it enables the above-mentioned angled tabs to be omitted together with their screws for fastening them to the semicircular elements and the bridges of the control ring.

Optionally, link-retaining means are mounted on the radial fingers and comprise U-shaped pieces with flanges including through orifices for passing the radial fingers and located on either side of a collar on each radial finger.

These retaining means may be made of light sheet metal without increasing total weight in penalizing manner.

BRIEF DESCRIPTION OF THE DRAWINGS

The invention will be better understood and other characteristics, details, and advantages thereof will appear more clearly on reading the following description given by way of example and made with reference to the accompanying drawings, in which.

MORE DETAILED DESCRIPTION

Figure 1:
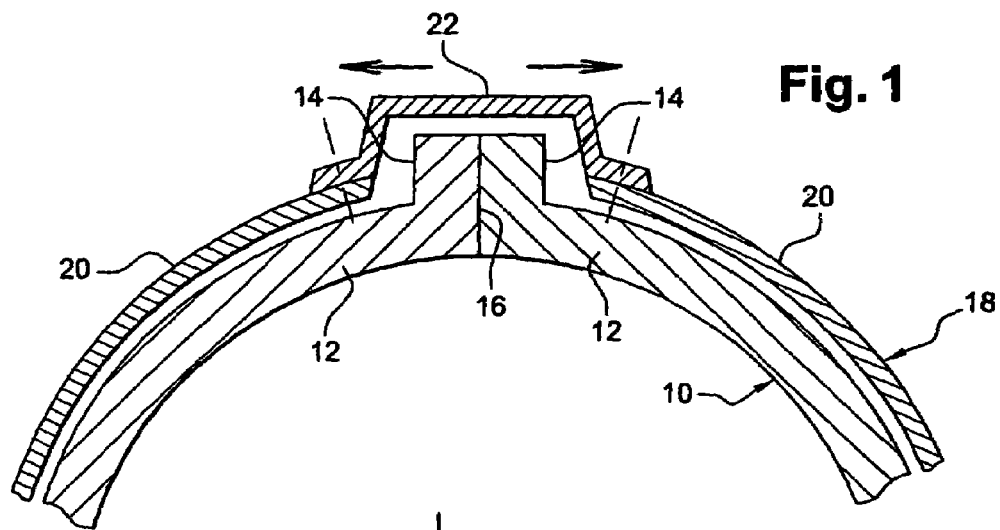
FIG. 1 is a fragmentary diagrammatic cross-section view of a turbomachine casing and a control ring.

FIG. 1 is a highly diagrammatic cross-section view showing a portion of a turbomachine casing 10, said casing being made up of two half-shells 12 having longitudinal assembly flanges 14 pressed against each other along a junction plane 16 and projecting outwards from the casing 10.

A ring 18 for controlling the angular position of variable-pitch vanes surrounds the outside of the casing 10 in the immediate vicinity thereof, and is made up of two approximately semicircular elements which are rigidly interconnected at their ends by two bridges 22, only one of which is shown in FIG. 1, each bridge being placed astride the longitudinal flanges 14 of the casing 10 and allowing the ring 18 to turn to a certain extent about its longitudinal axis, which coincides substantially with the longitudinal axis of the casing 10.

Figure 2:
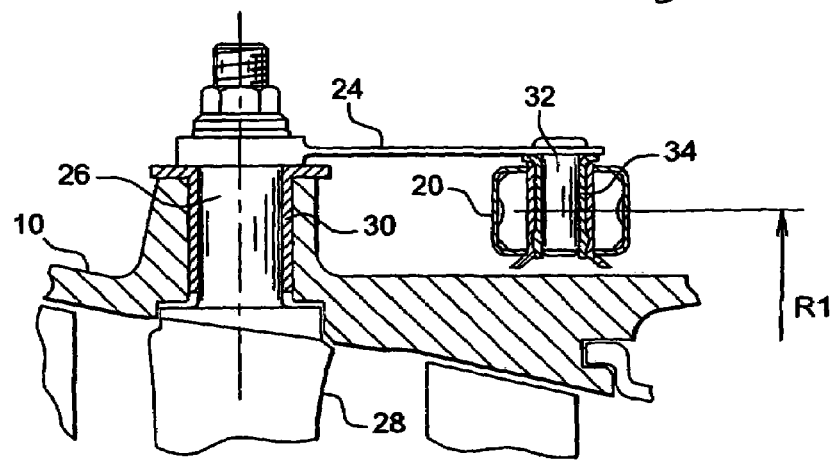
FIGS. 2 and 3 are fragmentary views showing the prior art configuration for connecting the links of the variable-pitch vanes to a control ring.
Figure 3:
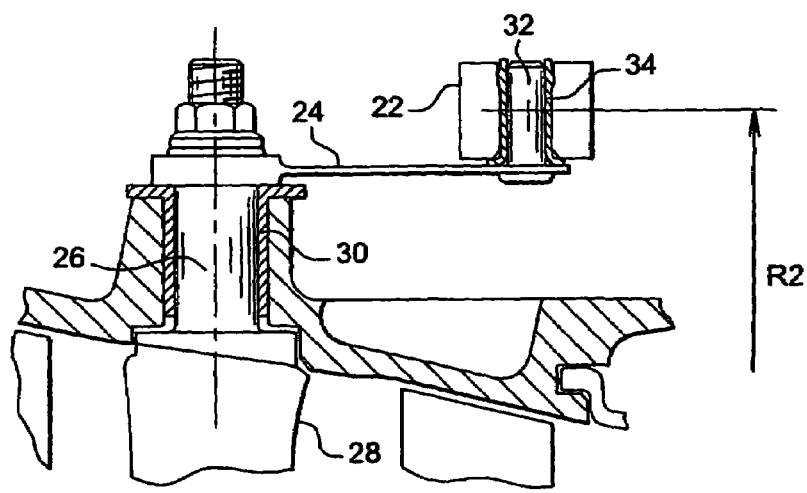

The means connecting the control ring to a row of variable-pitch vanes are shown diagrammatically in FIGS. 2 and 3.

These means comprise links 24, each of which is fixed at one end by a radial pivot 26 to a variable-pitch vane 28, each pivot 26 being pivotally guided in a bearing 30 mounted in a radial orifice through the casing 10. The other end of each link 24 carries a radial finger 32, e.g. crimped to said link end, and pivotally guided in a cylindrical bushing 34 mounted in a cylindrical housing in the control ring 18.

When a link 24 is connected to one of the semicircular elements 20 of the ring 18, as shown in FIG. 2, the fingers 32 extend radially towards the axis of the casing 10, with the links 24 being radially outside the semicircular elements 20.

Because the radial fingers 32 are guided in cylindrical bushings 34 that present a certain length, it is difficult to define accurately the distance between the longitudinal axis of the casing 10 and a hinge point for each radial finger 32 in its bushing 34.

If, for reasons of symmetry, these pivot points are considered, to a first approximation, to lie in the middle zones of the fingers 32 and the bushings 34, then these pivot points are at a distance R1 from the longitudinal axis of the casing 10.

When a link 24 is connected to a bridge 22 of the control ring 18, as shown in FIG. 3, the finger 32 extends radially outwards from the link 24 and the pivot point of the link 24 can in similar manner be situated approximately in the middle of the finger 32 and the bushing 34, and at a distance R2 from the pivot axis of the control ring 18, where R2 is greater than R1.

When the control ring is turned through an angle about its pivot axis, the vanes 28 are turned about the axes of their pivots 26 by an amount which is proportional to R1 for the vanes connected by the links 24 to the semicircular elements 20 of the control ring 18, and by an amount which is proportional to R2 for the vanes 28 which are connected by the links 24 to the bridges 22 of the control ring 18.

This difference of pivot angle between vanes 28 depending on whether they are connected to the elements 20 or to the bridges 22 of the ring 18 impedes optimization of the efficiency of the turbomachine.

To mitigate this drawback, the invention provides for mounting the links 24 to pivot on radial fingers 32 carried by the semicircular elements 20 and by the bridges 22 of the control ring 18, with the pivot points of the links all being at the same distance from the axis of the casing.

Figure 4:
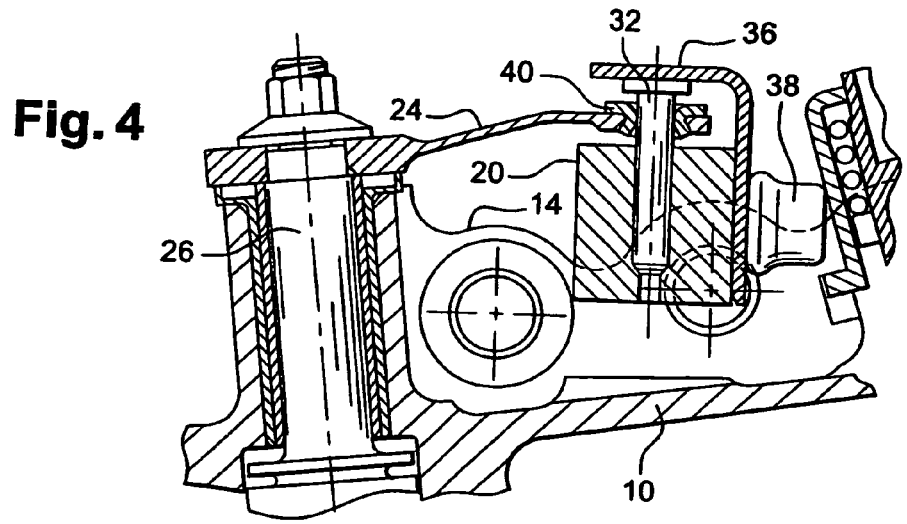
FIG. 4 is a fragmentary diagrammatic view showing a first embodiment of the device of the invention.

In the embodiment shown in FIG. 4, the radial fingers 32 are engaged in the cylindrical housings of the elements 20 of the control ring from the radially outer ends of said housings, and they are held in place by angled tabs 36 which bear against the radially outer ends of the fingers 32 and which are fixed to the elements 20 of the control ring by means of screws 38. At their radially inner ends, the fingers 32 bear against respective internal shoulders in their cylindrical housings.

Each ring 24 is secured at one end to the radial pivot 26 of a variable-pitch vane, and at its other end it includes an orifice in which there is engaged a washer 40 having the associated radial finger 32 passing therethrough, the inside surface of the washer 40 being flared from its middle portion towards its ends so as to provide a ball-and-socket type mount for the link 24 on the finger 32.

With such a mount, the pivot point of the link is situated level with the contact between the middle portion of the washer 40 and the radial finger 32.

When the link is connected to a bridge 22, the finger 32 extends radially outwards from the link, and the disposition is symmetrical to that shown in FIG. 4 about the link, but the pivot point of the link is still situated in the contact zone between the middle portion of the washer 40 and the radial finger 32 and is thus at the same distance from the pivot axis of the control ring 18.

Figure 5:
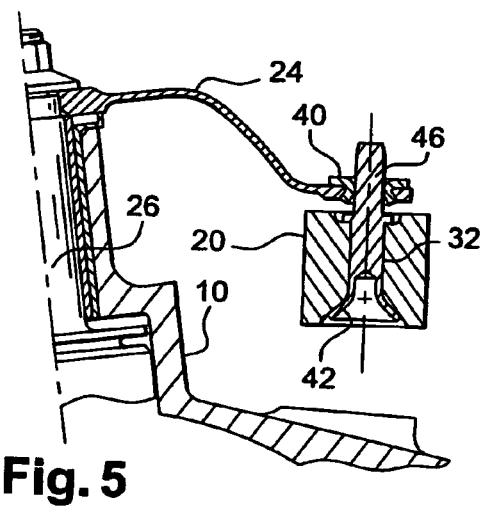
FIG. 5 is a diagram showing a variant embodiment of the device.
Figure 6:
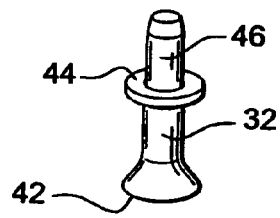
FIG. 6 is a diagrammatic perspective view of the radial finger in the FIG. 5 device.

In the variant embodiment shown diagrammatically in FIGS. 5 and 6, the radial finger 32 is fixed in an element 20 or a bridge 22 of the control ring by crimping one of its ends 42, and in its middle portion it has a collar 44 for bearing against a shoulder of the element 20 or of the bridge 22. The corresponding link 24 is mounted by means of a washer 40 of the above-specified type on the end portion 46 of the finger 32 opposite from its flared end 42 for crimping.

When the link 24 is connected to a semicircular element 20 of the control ring, as shown in FIG. 5, it is the radially inner end of the finger 32 that is crimped to the element 20, and it is its radially outer end that is engaged in the washer 40 at the end of the link 42. In contrast, when the link 24 is connected to a bridge 22, it is the radially outer end of the radial finger 32 which is crimped to the bridge, and it is the radially inner portion of said finger that is engaged in the washer 40 at the end of the link 24.

Figure 7:
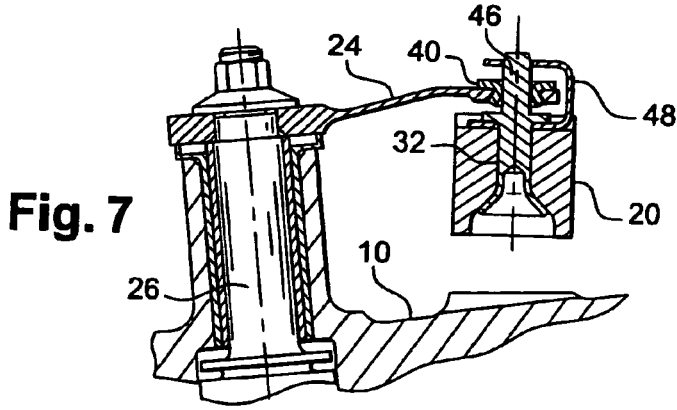
FIG. 7 is a diagram of another embodiment of the device of the invention.
Figure 8:
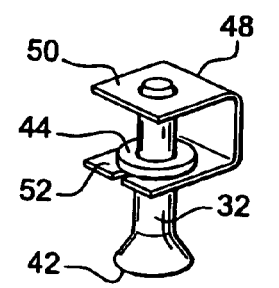
FIG. 8 is a diagrammatic perspective view of the radial finger and the link-retaining means of the FIG. 7 device.

In the variant embodiment shown in FIGS. 7 and 8, the configuration is substantially identical to that of FIGS. 5 and 6, but it includes an additional piece for retaining the link 24 on the end portion 46 of the radial finger 32, this retaining piece 48 being constituted, for example, by a piece of sheet metal folded into a U-shape and including one flange 50 pierced by a hole for engaging on the end 46 of the radial finger 32, and another flange 52 parallel thereto which includes an orifice for passing the finger 32 and which is designed to bear against the collar 44 of the finger, said collar thus lying between the two flanges 50 and 52 of the piece 48.

For assembly purposes, the piece 48 is open, the finger 32 is engaged in the orifice of the flange 52, and is then put into place in its cylindrical housing in the control ring 18 and is crimped at its end 42, after which the washer 40 of the link 24 is engaged on the end portion 46 of the finger 32 and the flange 50 is folded down so as to be substantially parallel to the flange 52, with the end of the radial finger 32 engaging in the corresponding orifice of the flange 50.

The embodiments of FIGS. 5 to 8 have the advantage of being lighter in weight than the embodiment of FIG. 4, with the saving in weight being about 0.72 kilograms (kg), for example, for the embodiment of FIG. 5, and about 0.65 kg for the embodiment of FIG. 7, in each row of variable-pitch vanes.

An advantage of the invention is that the links 24 of a row of variable-pitch vanes are identical and they displace the vanes angularly through the same angle for given pivoting of the control ring, regardless of whether the links are connected to the semicircular elements or to the bridges of the control ring.

What is claimed is:

1. A device for controlling variable-pitch vanes in a turbomachine, the vanes having radial pivots mounted in bearings in a casing and connected by links to a control ring surrounding the outside of the casing, said ring comprising two substantially semicircular elements rigidly interconnected at their ends by bridges disposed astride longitudinal flanges of the casing, wherein the links are pivotally mounted on the ends of radial fingers carried by the semicircular elements and by the bridges of the control ring, and wherein the fingers carried by the semicircular elements extend radially outwards from said elements, and the fingers carried by the bridges extend radially inwards from said bridges so that the pivot points of the links on said fingers are at the same distance from the pivot axis of the control ring both for the radial fingers carried by the semicircular elements and for the radial fingers carried by the bridges of the control ring.

2. A device according to claim 1, wherein the links are mounted in ball-and-socket manner on the radial fingers.

3. A device according to claim 1, wherein the radial fingers are mounted in radial cylindrical housings of the semicircular elements and of the bridges, and they are held therein by angled tabs fixed by screws to said elements and bridges and co-operating with the ends of the fingers on which the links are mounted.

4. A device according to claim 1, wherein the radial fingers are crimped at their ends remote from the links in cylindrical housings of the semicircular elements and of the bridges of the control ring.

5. A device according to claim 4, wherein means for retaining the links are mounted on the radial fingers.

6. A device according to claim 5, wherein the retaining means comprise U-shaped pieces having flanges with orifices for passing the radial fingers and located on either side of respective collars on the radial fingers.

* * * * *